G. O. TROXEL.
SELF TIGHTENING PULLEY.
APPLICATION FILED AUG. 10, 1911.
1,033,493.
Patented July 23, 1912.
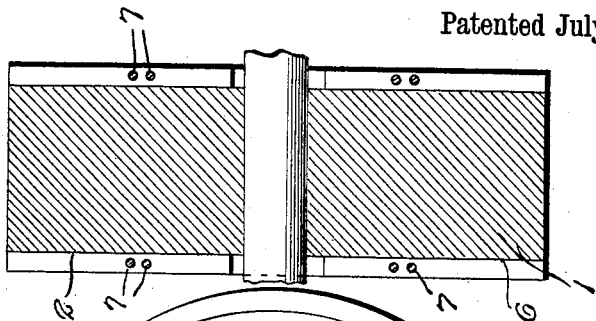
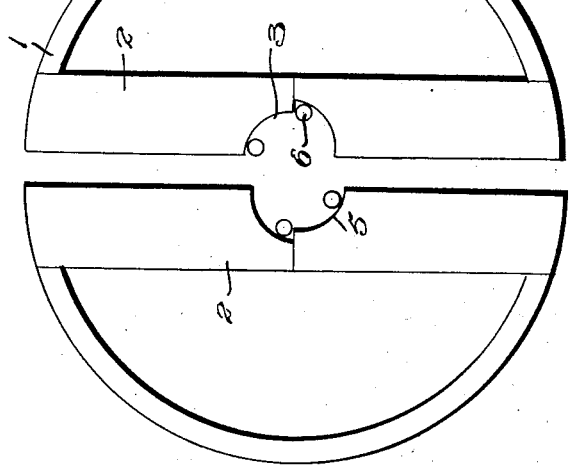
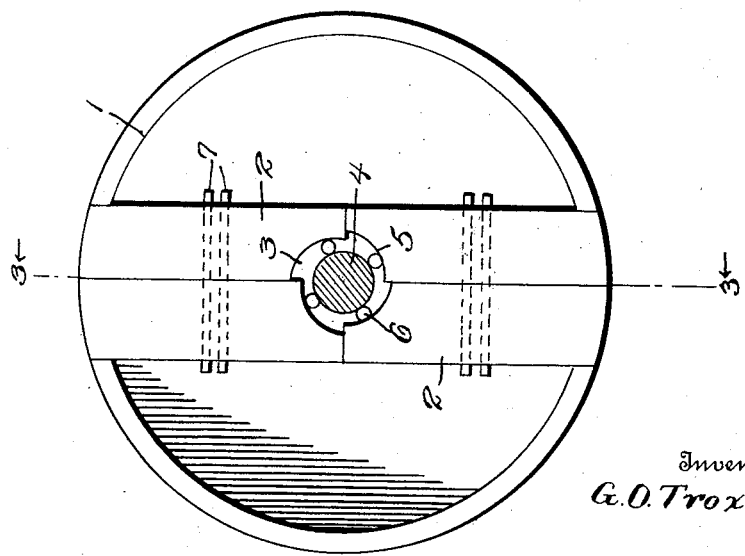
Inventor
G. O. Troxel.
Witnesses

UNITED STATES PATENT OFFICE.

GUERNIE O. TROXEL, OF CHINOOK, MONTANA.

SELF-TIGHTENING PULLEY.

1,033,493.  Specification of Letters Patent. Patented July 23, 1912.

Application filed August 10, 1911. Serial No. 643,301.

*To all whom it may concern:*

Be it known that I, GUERNIE O. TROXEL, a citizen of the United States, residing at Chinook, in the county of Chouteau and State of Montana, have invented certain new and useful Improvements in Self-Tightening Pulleys, of which the following is a specification.

This invention has relation to self tightening pulleys, and has for its object to provide means for securely holding a wooden or split pulley in position upon a shaft. With this object in view the pulley is provided at its opposite side portions with cross bars and with means for securing the said cross bars together. These bars are recessed at their inner edge portions and the said recesses are provided with cam faces. Rollers are interposed between the said cam faces and the periphery of a shaft upon which the pulley is mounted and are adapted to impinge against the said cam faces and the periphery of the shaft.

In the accompanying drawing: Figure 1 is a side elevation of the pulley with the opposite side portions joined together; Fig. 2 is a similar view with the side portions of the pulley separated; and Fig. 3 is a transverse sectional view of the pulley.

Corresponding and like parts are referred to in the following description and indicated in all the views of the accompanying drawing by the same reference characters.

As illustrated in the accompanying drawing the pulley 1 is provided at its opposite side portions with cross bars 2 which are recessed at their inner edge portions and at points between their ends as at 3. These recesses are adapted to receive the shaft 4 between them and the recesses are provided with cam faces 5. Rollers 6 are inserted in the recesses 3 between the cam faces thereof and the periphery of the shaft 4. These rollers are of general cylindrical configuration and when the pulley 1 is rotated the rollers pass toward the ends of the cam faces 5 which are nearest the center of the shaft 4 and impinge against the said cam faces and the periphery of the shaft 4, whereby the pulley 1 is securely fixed upon the said shaft. By rotating the pulley in the opposite direction the rollers will move toward those ends of the cam faces 5 which are more remote from the center of the shaft 4 and consequently the rollers will be rendered loose in the recesses and may be slipped longitudinally therefrom. Then by removing the securing devices 7 which connect the cross bars 2 together, the opposite side portions of the pulley 1 may be separated and removed from off of the shaft.

Having thus described the invention, what is claimed as new is:

In combination with a shaft, a pulley consisting of mated side portions having at their center an opening which snugly receives the shaft, cross bars applied to the sides of said portions and being arranged in pairs on each portion, the members of each pair abutting against each other at their inner ends, means for securing the cross bars on the opposite portions together, each cross bar having at its inner end a cam face which is spaced from the shaft, and rollers interposed between the said cam faces and the periphery of the shaft.

In testimony whereof, I affix my signature in presence of two witnesses.

GUERNIE O. TROXEL. [L. S.]

Witnesses:
D. L. BLACKSTONE,
WM. A. BOWMAN.

Copies of this patent may be obtained for five cents each, by addressing the "Commissioner of Patents, Washington, D. C."